Dec. 15, 1931.  C. H. COLVIN  1,837,158

COMPASS MOUNTING

Filed May 11, 1929

INVENTOR
CHARLES H. COLVIN

BY
Cooper, Kerr + Dunham
ATTORNEYS

Patented Dec. 15, 1931

1,837,158

UNITED STATES PATENT OFFICE

CHARLES H. COLVIN, OF BROOKLYN, NEW YORK, ASSIGNOR TO PIONEER INSTRUMENT COMPANY, INCORPORATED, OF BROOKLYN, NEW YORK, A CORPORATION OF NEW YORK

COMPASS MOUNTING

Application filed May 11, 1929. Serial No. 362,186.

This invention relates to mountings for compasses and is particularly applicable to liquid compasses. Compasses which are used on aircraft are subjected to vibration and oftentimes to severe shock, either of which conditions adversely influences their usefulness. The engines used on aircraft are high powered and the vibrations produced thereby are readily transmitted to the supporting frame and mounting of the compass with the result that the compass-card of the compass, which is an instrument very sensitive to vibrations, will swing and sometimes spin. Such vibration, as well as other causes creative of equilibrium disturbances, also operate to destroy the orientation of the lubber's line. While it is well nigh impossible to eliminate the causes of the disturbing influences there is, nevertheless, a real problem to which must be applied corrective measures. It, therefore, is among the objects of my invention to provide a compass mounting which will support a compass and prevent the transmission of undesired vibrations thereto.

Another object of my invention is to provide a compass mounting adapted to support the compass in a normally fixed position in relation to a base or to the sub-structure of the main body to which the base is connected, but not in rigid relation thereto, whereby severe shock upon the sub-structure of the body forming a part of the aircraft or other vehicle will not permanently disturb the correct setting of the compass' lubber's line.

A still further object of the invention is to provide a combined vibration dampening and shock absorbing mounting for a compass which is of a simple form, is easily assembled and adjusted, and has the advantageous feature of compactness which makes it practical for aircraft use.

Other objects and advantages will be pointed out hereinafter in the description of a preferred form of my invention and in the claims.

Figure 1:
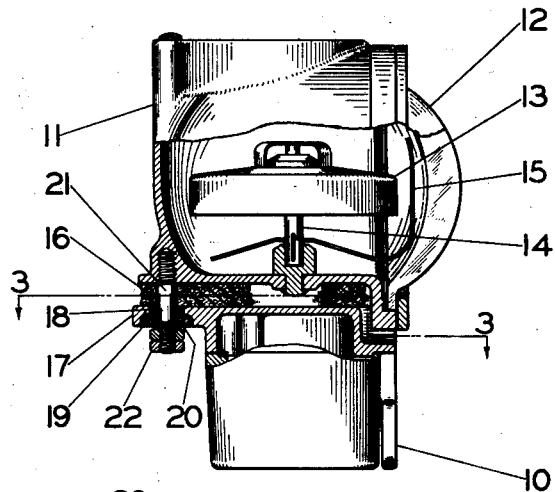
Fig. 1 is an elevation showing the mounting in section.
Figure 2:
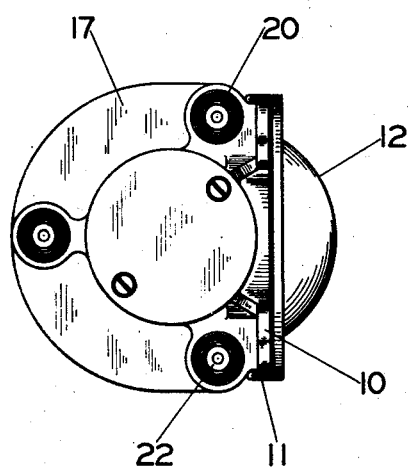
Fig. 2 is a view taken from below the assembly of Fig. 1.
Figure 3:
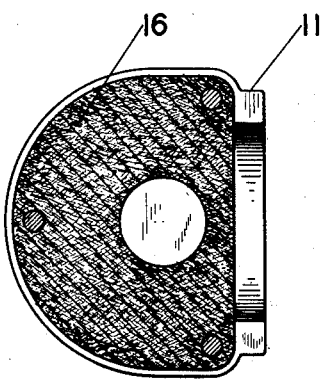
Fig. 3 is a section taken on line 3—3 of Fig. 1.
Figure 4:
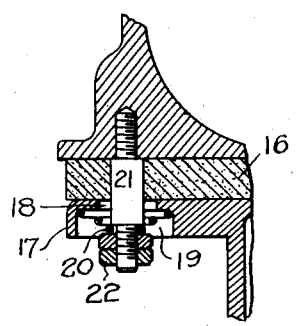
Fig. 4 is an enlarged sectional view of a portion of the mounting shown in Fig. 1 illustrating in detail the assembly thereof.

Having in mind the rigorous conditions capable of affecting the continuous dependability of a compass when used on an airplane, any mounting for a compass which does not insulate the compass from deleterious vibrations is impractical. The vibrations directly affect the substructure of an airplane, its fuselage, instrument-board and any part or instrument carried thereby.

Various types of mountings have been used but my objective is to provide one which obviates the short-comings of prior mountings. To this end, it is a principle or law of my invention that the compass-bowl and its immediate supporting base be so related as to enable the center of mass of the compass-bowl to be as close to the supporting surface of the supporting base as is practically possible and, also, that the supporting surface be substantially coextensive with the horizontal projection of the compass-bowl. This arrangement, coupled with the use of suitable padding between the compass-bowl and its supporting base, adequately eliminates the pendulous action or tilting vibrations of the compass-bowl which are common to other compass mountings with which I am familiar.

While my mounting may take various forms, I prefer the arrangement illustrated in the drawings. This arrangement is very effective and, though a special base 10 is provided for association with an instrument board (not shown), it is clear that the mass of the compass does not overhang the base. The compass has a compass-bowl 11 with a lens 12 through which the compass-card 13 may be observed. This compass-card is mounted upon a post 14 and is free to tilt and turn. A liquid fills the compass-card chamber and it is usual to provide a lubber's line 15 which is within the chamber and may not be tampered with. The compass-bowl has a low center of gravity which permits the placing of a vibration insulating pad 16 near to its center of mass. No other member need be located between the compass and its support, the lower surface of the compass-bowl 11 and the supporting surface of the base 10 contacting directly with the pad 16. For the purposes of a compass mounting I have found that a quality of felt which is not too soft is admirably suited. Whatever the material used may be, it must preferably have no period of vibration of its own (i. e. be aperiodic), be resilient and possess high internal friction. I have found that a felt pad answering to the specifications, "S. A. E. F No. 13, black felt," possesses the characteristics desired.

While the base 10 may take divers forms, the one illustrated is suitable for attachment to an instrument-board (not shown). It is provided with a plate portion 17 having a plurality of holes 18 and recesses 19 in its under side. Each recess accommodates the base end of a conoidal helical spring 20 which rests upon the bottom surface of the recess and contacts with the wall of the recess. Holes 18 constitute openings through plate 17, each of which is sufficiently large to permit a pin 21 to pass therethrough without contacting the edge of a hole. Pins 21 may take any convenient form and, as illustrated, they constitute studs, each having one end screwed into the compass-bowl and the other end in engagement with the small end of a spring 20. Three springs and associated nuts 22, which hold the springs in place, are provided.

It is apparent from the foregoing description that the function of the pins 21 and springs 20 is to maintain the compass and hence the lubber's line centralized in respect to the base 10 or body portion of the aircraft and that it is necessary only that the springs be disposed between the pins and either the compass or base. By virtue of the helical springs 20 and the pad 16 there is no rigid connection between the compass and its supporting structure, although it is to be understood that the springs are intended to be sufficiently initially compressed to assist in maintaining the pad in a normal position and effective condition.

My compass mounting has a very important advantage because of the compactness thereof, for by its use it is possible to place other instruments close by on the same instrument board. For example, it is apparent that the use of a turn indicator for indicating the rate of turn of an aircraft is closely associated with the use of a compass and that under certain conditions it is necessary to observe these two instruments simultaneously. By mounting the compass-bowl in the manner described it is possible to place the turn indicator above the compass and in close proximity thereto.

I claim:

1. The combination with a compass and a base for supporting the same, of means intermediate the compass and base for absorbing vibrations emanating from the base and preventing their transmittal to the compass, said means comprising a pad of resilient material coincident with the compass and base, and means maintaining the compass, pad, and base in normally centralized relation to each other, said last named means comprising a plurality of pins carried by the compass in a common plane and arranged in triangular relation, and a conoidal spring associated with each of said pins and arranged to assist in absorbing said vibrations and to maintain the compass indisplaceable in any direction in respect to the base.

2. The combination with a compass having a compass-bowl and a base for supporting the same, of a felt pad intermediate the base and compass-bowl and supporting the latter for absorbing vibrations emanating from the base and preventing their transmittal to the compass-bowl, and means for holding the compass-bowl upon the felt pad coincident with the base and in centralized relation with respect to the latter, said means comprising a plurality of pins rigidly secured to said compass-bowl in a common plane and extending through openings in said base without engaging with the edges of the openings, conoidal helical springs mounted upon said pins, each spring having one end thereof in contact with a recess in the base and its other end in contact with its associated pin, and means mounted on said pins for holding said springs thereon and in slightly compressed relation with respect to the base, thereby holding the compass-bowl in resilient engagement with the felt pad and preventing displacement of said bowl in any direction with respect to the base.

3. The combination with a compass having a compass-bowl and a base for supporting the same, of means intermediate the compass-bowl and base for absorbing vibrations emanating from the base and preventing their transmittal to the compass-bowl, said means comprising a pad of resilient material coincident with the compass-bowl and base, and means for maintaining the compass-bowl in centralized relation with respect to the base irrespective of the tendency of the latter to be displaced in any direction relative to the former, said last named means comprising a plurality of centering pins rigidly carried by the compass-bowl and arranged in triangular relation in a common plane and extending through openings in said base without engaging with the edges of the openings, a conoidal helical spring mounted upon each of said pins, each spring having the end of greater diameter in contact with a recess coaxial with its associated opening in the base and its end of smaller diameter in contact with its associated pin, and means mounted on said pins for holding said springs thereon in slightly compressed relation in respect to the base, thereby resiliently holding the compass-bowl in engagement with the base and preventing the displacement of said compass-bowl in any direction with respect to the base.

4. A mounting for supporting a compass having a bowl, comprising in combination, a base having a substantially horizontal surface, a soft felt pad resting upon said surface, said pad serving to contact with the lower surface of the compass-bowl of the compass and support the compass, a plurality of pins for maintaining the compass indisplaceable in any direction laterally in respect to the base, each of said pins being rigidly embedded in the compass-bowl and extending through an aperture in said base without contacting therewith, a plurality of conoidal springs in engagement with the pins and recesses formed in the base coaxial with the apertures in said base and yieldingly maintaining the pins out of contact with the base, and means holding said compass-bowl, pad and springs in place.

In testimony whereof I hereto affix my signature.

CHARLES H. COLVIN.